United States Patent [19]
Teck et al.

[11] Patent Number: 5,999,352
[45] Date of Patent: Dec. 7, 1999

[54] VARIABLE BITS PER INCH RECORDING

[75] Inventors: Say Kwee Teck; Quak Beng Wee; Myint Ngwe, all of Singapore, Singapore

[73] Assignee: Seagate Technology, Inc., Scotts Valley, Calif.

[21] Appl. No.: 08/857,519

[22] Filed: May 16, 1997

Related U.S. Application Data

[60] Provisional application No. 60/036,701, Jan. 31, 1997.

[51] Int. Cl.$^6$ ........................................................ G11B 5/09
[52] U.S. Cl. ................................................ 360/48; 360/51
[58] Field of Search .................................. 360/75–76, 51, 360/48, 104, 106–107, 119–121

[56] References Cited

U.S. PATENT DOCUMENTS

| | | | |
|---|---|---|---|
| 3,947,876 | 3/1976 | Gray | 360/40 |
| 4,945,427 | 7/1990 | Cunningham | 360/75 |
| 5,296,979 | 3/1994 | Kawabe et al. | 360/97.01 |
| 5,870,237 | 2/1999 | Emo et al. | 360/48 |

*Primary Examiner*—Andrew L. Sniezek
*Assistant Examiner*—Dan I. Davidson
*Attorney, Agent, or Firm*—Westman, Champlin & Kelly, P.A.

[57] ABSTRACT

A disc drive and a method of storing data using the disc drive are disclosed. Multiple data heads are each supported adjacent a corresponding one of multiple disc surfaces of a disc stack to form multiple head/media combinations. A separate guardband or recording density capability for each of the multiple head/media combinations is determined. An actual recording density is assigned to each of the multiple head/media combinations based upon the recording density capability for the particular head/media combination. The actual recording density assigned to each of the multiple head/media combinations can be different from the actual recording densities assigned to other head/media combinations. The disc drive is controlled such that data is recorded on each of the surfaces at the actual recording density assigned thereto.

1 Claim, 3 Drawing Sheets

VARIABLE BITS PER INCH RECORDING

The present application claims the benefit of earlier filed U.S. Provisional Application No. 60/036,701, entitled "VARIABLE BPI (BITS PER INCH) RECORDING", filed on Jan. 31, 1997.

BACKGROUND OF THE INVENTION

The present invention relates generally to disc drive data storage systems having multiple discs mounted on a spindle to form a disc stack. More particularly, the present invention relates to a disc drive data storage system in which data is recorded on different surfaces of the disc stack at different recording densities in order to optimize the performance of the disc drive.

A typical disc drive data storage system can include multiple magnetic discs mounted for rotation on a hub or spindle. A spindle motor causes the discs to spin and the surface of the discs to pass under respective head gimbal assemblies (HGAs). The HGAs carry transducers which write information to, and read information from the disc surfaces. An actuator mechanism moves the HGAs from track to track across surfaces of the discs under control of electronic circuitry. Read and write operations are performed through a transducer which is carried in a slider body. The slider and transducer are sometimes collectively referred to as a head, and typically a single head is associated with each disc surface. The heads are selectively moved under the control of electronic circuitry to any one of multiple circular, concentric data tracks on the corresponding disc surface by an actuator device. Each slider body includes an air bearing surface (ABS). As the disc rotates the disc drags air beneath the ABS, which develops a lifting force which causes the head to lift and fly several microinches above the disc surface.

In existing disc drive systems, one of the parameters which dictates the AREAL density is the recording density, typically designated in bits per inch (BPI). Recording density is a predetermined parameter at the disc drive design stage. All disc surfaces in the disc stack are set to one standard recording density or BPI value. The maximum recording density is usually determined by the available head, disc surface and read channel capabilities. To ensure the maximum production yield and read channel margin, this recording density is usually set at a point where the drive still has sufficient read channel margin under the worst case combination of head, media (i.e., disc surface) and read channel distribution.

This current recording density scheme results in the margin available not being maximized for good head/media surface combinations, while stressing the available channel margin for the worst head/media combinations. In a multiple disc pack drive, by probability, there will virtually always be the situation where the various head/media combinations have different margins available. A single low margin head/media combination will usually result in the disc drive not meeting the desired drive error rate, even though all other head/media combinations in the disc drive may exceed the required channel margin.

SUMMARY OF THE INVENTION

A disc drive and a method of storing data using the disc drive are disclosed. Multiple data heads are each supported adjacent a corresponding one of multiple disc surfaces of a disc stack to form multiple head/media combinations. A separate guardband or recording density capability for each of the multiple head/media combinations is determined. An actual recording density is assigned to each of the multiple head/media combinations based upon the recording density capability for the particular head/media combination. The actual recording density assigned to each of the multiple head/media-combinations can be different from the actual recording densities assigned to other head/media combinations. The disc drive is controlled such that data is recorded on each of the surfaces at the actual recording density assigned thereto.

DETAILED DESCRIPTION OF THE PREFERRED EMBODIMENTS

Figure 1:
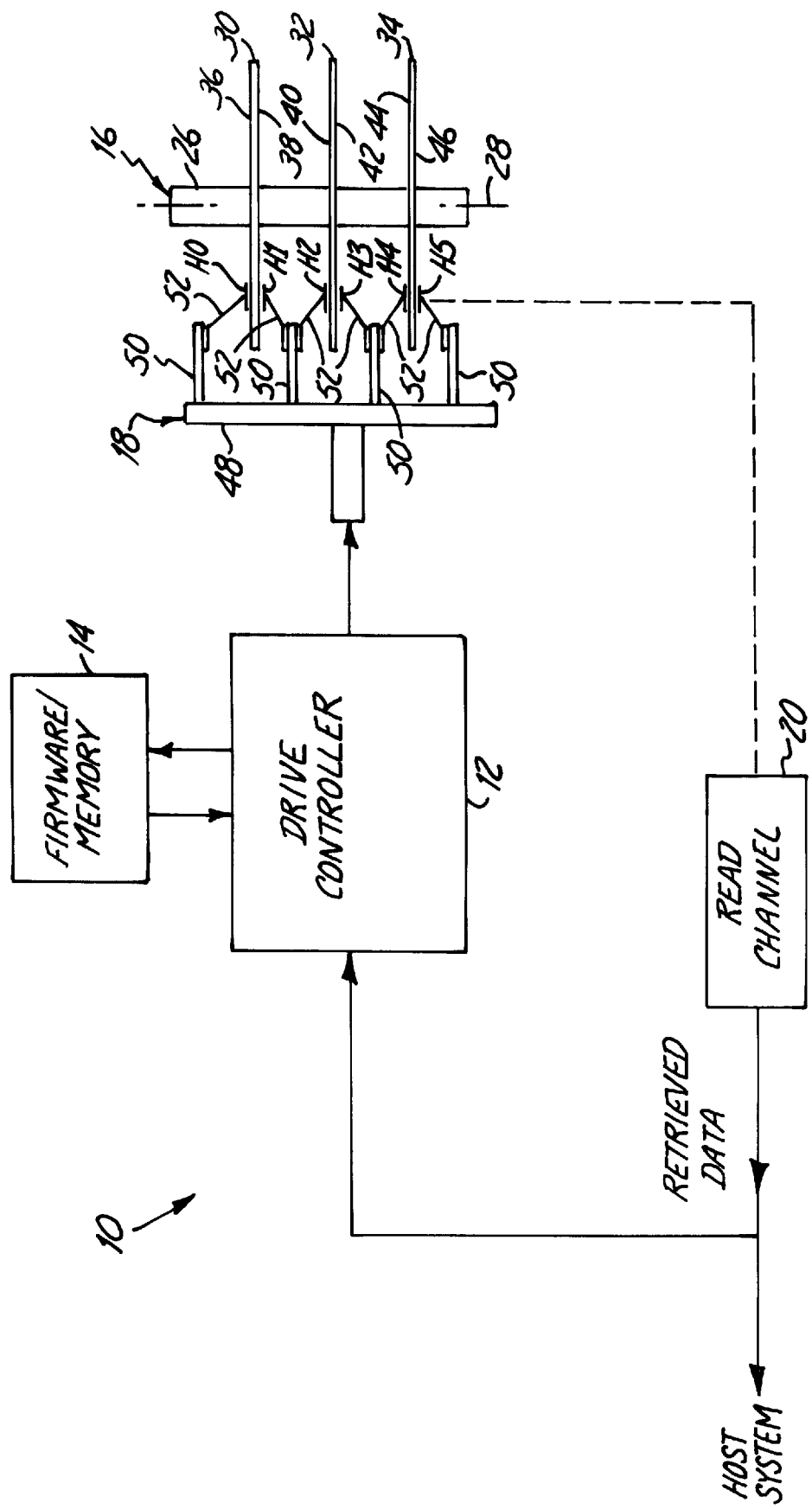
FIG. 1 is a block diagram of a portion of a disc drive according to the present invention.

FIG. 1 is a block diagram of disc drive according to the present invention. Disc drive 10 includes drive controller 12, memory 14, disc stack assembly 16, actuator assembly 18 and read channel 20. Drive controller 12 is typically a microprocessor or digital computer, and is coupled to a host system which instructs controller 12 to store data on, and retrieve data from, disc stack 16.

Memory 14 can be any of a variety of well known data storage devices capable of storing data for use by controller 12. Also, memory 14 can include a combination of different types of memory devices such as read only memory (ROM) and volatile or non-volatile random access memory (RAM). In preferred embodiments, memory 14 stores the firmware programming used by drive controller 12 in order to implement the variable recording density aspects of the present invention.

Disc stack assembly 16 includes spindle 26 which supports multiple coaxially arranged discs 30, 32 and 34. The discs are mounted for rotation with spindle 26 about axis of rotation 28. Each of the discs has a first surface and a second surface. First disc 30 has first surface 36 and second surface 38. Second disc 32 has first surface 40 and second surface 42. Third disc 34 has first surface 44 and second surface 46. All of surfaces 36, 38, 40, 42, 44 and 46 include concentric tracks for receiving and storing data in the form of flux reversals encoded on the tracks.

A group of tracks which include one track on each of surfaces 36, 38, 40, 42, 44 and 46, wherein each track in the group is located a common radial distance from the inner diameter of the corresponding disc upon which is resides, is referred to as a cylinder. In the prior art, the recording density at which data was stored in a particular cylinder was a predetermined fixed value, regardless of disc surface or media on which the various data tracks resided. As is discussed below in greater detail, the present invention optimizes the performance of drive 10 by recording data on various disc surfaces of a particular cylinder at differing recording densities, determined by the recording density capability for the particular surface and its corresponding data read. In general, with the present invention, a recording density is determined separately for each disc surface and used throughout the disc surface.

Actuator assembly 18 includes actuator 48 supporting multiple actuator arms 50. Each of actuator arms 50 is rigidly coupled to at least one head assembly 52. Each head assembly 52 includes a load beam, or a flexure arm, rigidly coupled to actuator arm 50 at a first end, and to a suspension or gimbal at a second end. The suspension is, in turn, coupled to a hydrodynamic air bearing which supports a data head (i.e., data heads H0, H1, H2, H3, H4 and H5) above the corresponding disc surface. Each data head typically includes a read transducer and a write transducer carried by a slider. As shown, data heads H0, H1, H2, H3, H14 and H5 are supported adjacent respective medias or surfaces 36, 38, 40, 42, 44 and 46.

Actuator 48 is rotatably mounted with respect to discs 30, 32 and 34. Actuator 48 typically includes a voice coil which interacts with a magnet to produce the selective rotation of actuator 48. As actuator 48 rotates, it moves the transducers coupled to the head assemblies either radially inward or radially outward on the discs. In this way, actuator 48 positions the transducers on the various heads over a desired track (and cylinder) on the corresponding discs.

Read channel 20 is electrically coupled to each of heads H0, H1, H2, H3, H4 and H5 and carries signals read by various heads from their corresponding disc surfaces to a host system which has instructed disc drive 10 to retrieve the data. Also, read channel 20 can carry servo signals read by one or more of the heads from a servo data track. As is known in the art, the servo position information can be provided to drive controller 12 and used to control actuator assembly 18 to achieve head positioning over a desired cylinder. Read channel 20 can also include other components, for example amplifiers and filters, for conditioning the read back signal. In the prior art, the recording density (sometimes referred to as maximum BPI or bits per inch) for all medias or disc surfaces is usually determined by the available head, media and read channel capabilities. To ensure maximum production yield and read channel margin, this recording density for the disc drive is usually set at a point where the drive still has sufficient read channel margin under the worst combination of head, media and read channel distribution. This conventional scheme results in not maximizing the margin available with good head/media combinations, while stretching the available channel margin for the worst head/media combinations. In a disc drive having multiple discs, and therefore having multiple head/media-combinations, the situation usually exists where the various head/media combinations have different recording density capabilities, and thus different margins. A single head/media combination having a low margin frequently results in the disc drive not meeting the desired drive error rate, even though all other head/media combinations in the drive may exceed the channel margin.

Figure 2:
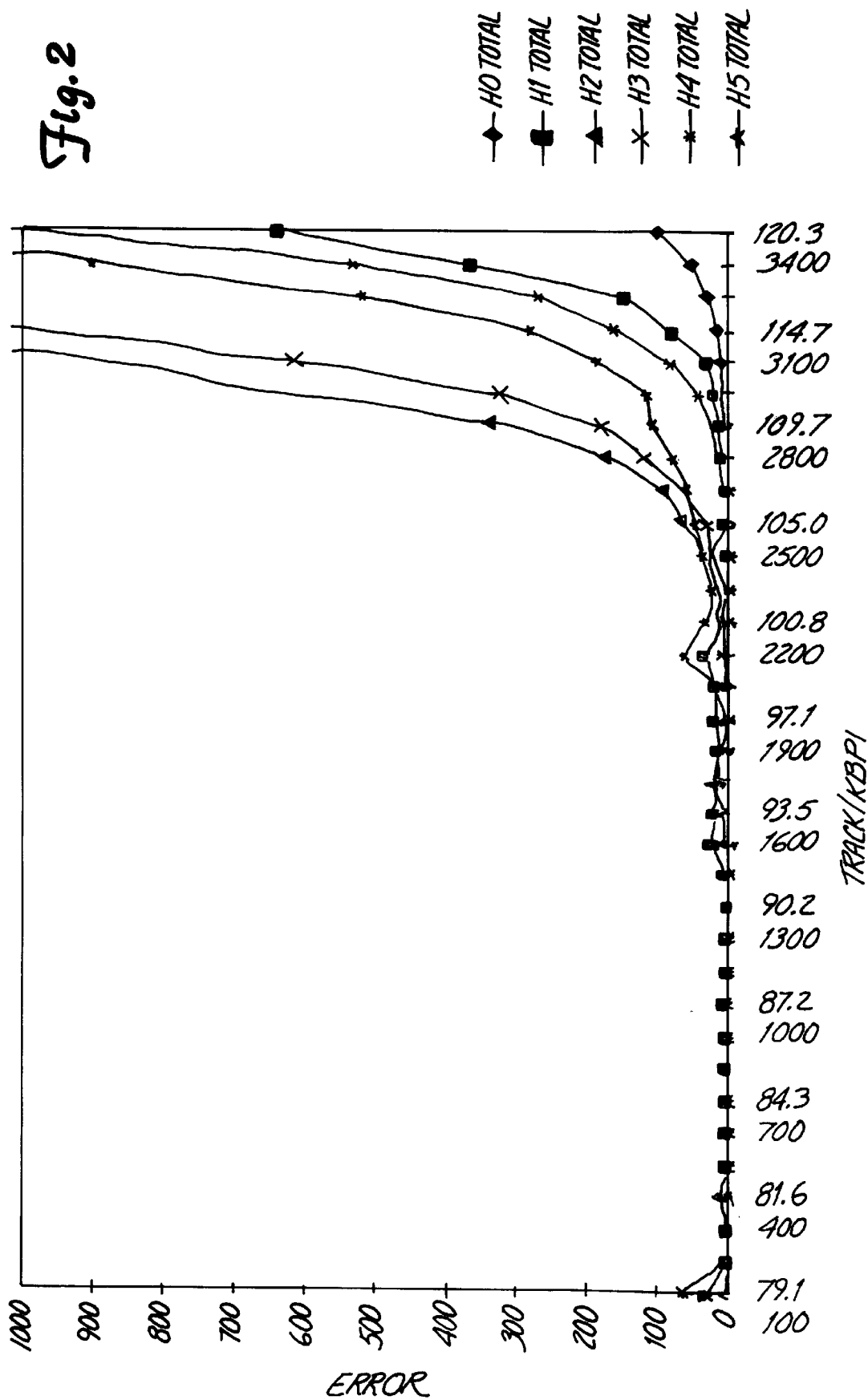
FIG. 2 is a plot illustrating typical variations of head/media surface combination recording density margin capabilities for six head/media surface combinations within a disc pack.

FIG. 2 is a plot which illustrates the typical variation of head/media margin capability within a disc pack. The plot of FIG. 2 shows the capability (measured by the total number of errors detected) as the recording density (in KBPI) increases, for six head/media combinations. The curve designated as "H0 Total" represents the total number of errors, as a function of recording density, for the combination of the Head H0 and disc surface 36. The curve designated as "H1 Total" represents the total number of errors for the head/media combination of head H1 and disc surface 38. The curve designated as "H2 Total" represents the total number of errors for the head/media combination of head H2 and disc surface 40. The curve designated as "H3 Total" represents the total number of errors for the head/media combination of head H3 and disc surface 42. The curve designated as "H4 Total" represents the total number of errors for the head/media combination of head H4 and disc surface 44. The curve designated as "H5 Total" represents the total number of errors for the head/media combination of head H5 and disc surface 46.

At the disc drive design stage, a bit error rate that the designers deem acceptable is set. This maximum bit error rate is typically referred to as an avalanche errors threshold. The avalanche KBPI or avalanche recording density is the recording density for a particular head/media combination when the avalanche errors threshold is reached. The guardband KBPI or guardband recording density is the maximum recording density a designer can use, taking into account a predetermined design margin. In general, the guardband recording density can be defined as the avalanche recording density minus the desired design margin. The guardband recording density can also be referred to as a design recording density or a recording density capability.

Table 1 illustrates the avalanche recording density (in KBPI) and the guardband recording density (in KBPI) for each head/media combination illustrated in FIG. 1 for one typical disc drive 10.

TABLE 1

| Head #/<br>Disc Surface | Avalanche<br>Recording<br>Density<br>(KBPI) | Guardband<br>Recording<br>Density<br>(KBPI) |
| --- | --- | --- |
| H2/40 | 107 | 97 |
| H3/42 | 108 | 98 |
| H5/46 | 110 | 100 |
| H4/44 | 113 | 103 |
| H1/38 | 115 | 105 |
| H0/36 | 120 | 110 |

As can be seen from the differences between the avalanche recording density and the guardband recording density for each head/media combination illustrated in Table 1, a design margin of 10 KBPI is assumed. As can further be seen in Table 1, the guardband recording densities for the various head/media combinations range from 97 KBPI to 110 KBPI. If the recording density for a disc drive having the distribution illustrated in Table 1 were set at 102 KBPI for all disc surfaces, the head/media combinations corresponding to heads H2, H3 and H5 will not have sufficient margin (i.e., the recording density would surpass the guardband), while the head/media combinations corresponding to heads H0, H1 and H4 will have more than sufficient margin. In this case, the drive would fail the required minimum margin requirement which is established for the entire drive. Therefore, in the prior art, to ensure that the drive would pass with the required guardband, the recording density for all disc surfaces would be set at 97 KBPI. This scheme is not efficient since it results in the drive performance being determined by the worst case head/media combination in a disc stack.

Disc drive 10 of the present invention overcomes this inefficiency by setting the actual recording density for each individual head/media combination based upon the head/media combination recording density capability (i.e. according to the guardband recording density for the head/media combination). This is illustrated in Table 2.

TABLE 2

| Hd #/Disc Surface | Avalanche Recording Density (KBPI) | Guardband Recording Density (KBPI) | Actual Recording Density (KBPI) | Delta to Effective Recording Density (102 KBPI) |
|---|---|---|---|---|
| H2/40 | 107 | 97 | 97 | 97 − 102 = −5 |
| H3/42 | 108 | 98 | 98 | 98 − 102 = −4 |
| H5/46 | 110 | 100 | 100 | 100 − 102 = −2 |
| H4/44 | 113 | 103 | 102 | 102 − 102 = 0 |
| H1/38 | 115 | 105 | 105 | 105 − 102 = +3 |
| H0/36 | 120 | 110 | 110 | 110 − 102 = +8 |
|  |  |  |  | 0 net capacity change |

For the head/media combination of head H2 and disc surface 40, the actual recording density is still set at 97 KBPI in order not to violate the guardband recording density. However, for each of the remaining five head/media combinations, the actual recording density is increased from the 97 KBPI recording density which would be used for all disc surfaces in the prior art. The recording density for each head/media combination is set at a level which does not violate the guardband for the particular head/media combination.

The actual recording density for the head/media combination of head H3 and disc surface 42 is set at 98 KBPI. The actual recording density for the head/media combination of head H5 and disc surface 46 is set to the corresponding guardband of 100 KBPI. The actual recording density for the head/media combination of head H1 and disc surface 38 is set to the corresponding guardband of 105 KBPI. The actual is recording density corresponding to the head/media combination of head H0 and disc surface 36 is set to the corresponding guardband recording density of 110 KBPI. The head/media combination of head H4 and disc surface 44 is set 1 KBPI below the guardband recording density of 103 KBPI, to 102 KBPI.

It is noted that, unlike the other head/media combinations, the actual recording density for head H4 and disc surface 44 is not set exactly to the corresponding guardband recording density. Optimally, the actual recording density for each head/media combination can be set to the corresponding guardband recording density. However, the total drive capacity for the disc drive is typically established by setting an effective recording density or average recording density for the drive such that the net capacity change is equal to zero. In other words, if an effective recording density of 102 KBPI is set for disc drive 10, the summation of the differences between the actual recording density of each head/media combination and the effective recording density equals zero. For an effective recording density of 102 KBPI for the disc drive, this is shown in the last column of Table 2. For this reason, the actual recording density for head H 4 and disc surface 44 was set in this example to 102 KBPI instead of 103 KBPI. However, although the net capacity change should always be zero, it is not necessary for the effective recording density for the drive to be set to an integer value. For example, if the effective recording density for the disc drive were set to 102.167 KBPI, the actual recording density for head H4 and disc surface 44 could also be set to the guardband recording density of 103 KBPI. In this instance the net capacity change from this new effective recording density would still be zero for the disc drive. With an effective recording density for the disc drive set to 102.167 KBPI, the delta to the effective recording density for the head/media combination corresponding to heads H2, H3, H5, H4, H1 and H0 would then be −5.167, −4.167, −2.167, +0.833 (assuming Head H4 has an actual recordang density at 103 KBPI), +2.833, and +7.833, respectively.

The present invention ensures that the available margin for each head/media combination of disc drive 10 is optimized. Head/media combinations with more than adequate margin as indicated in the plot of FIG.2 (i.e., heads H0, H1 and H4) can use a higher KBPI setting. Heads/media combination (i.e., heads H2, H3, and H5) with poor margin can use a lower KBPI setting. The overall capacity is still maintained. This essentially results in shifting "extra" margin available from heads H0, H1 and H4 to heads H2, H3 and H5. The effect of the shift of margin from a good head/media combination to a lower margin head/media combination results in the design of disc drive 10 with a higher capacity than possible without the present invention. In this case, the effective recording density using the present invention can be 102 KBPI instead of 97 KBPI as was the case in the prior art. This represents an increase of 5 percent more capacity than otherwise possible. Viewed another way, the present invention allows poorer margin head/media combinations to be used on a drive which would otherwise have failed because of only one head/media combination having a poor margin.

The present invention is implemented in the software or firmware programming of drive controller 12. This firmware can be stored in associated memory 14. During the disc drive fabrication process, the actual recording densities for each head/media combination are determined and programmed into drive controller 12 and/or memory 14 in any of a variety of conventional manners. For example, this information can be sent to controller 12 from a host system. In the alternative, memory 14 can be a replaceable module which is preprogrammed with the variable actual recording density information prior to insertion into disc drive 10. Then, during operation, drive controller 12 controls the recording density on each disc surface in the manner described above. Typically, this will mean that controller 12 controls actuator assembly 18 and the corresponding heads to record data on each disc surface at a single actual recording density established for that disc surface. However, this can also mean that, for a given cylinder (i.e. set of data tracks on each of the disc surfaces), the recording density of the corresponding data tracks of the cylinder are set to differing and unique values established for the particular head/media combinations.

Figure 3:
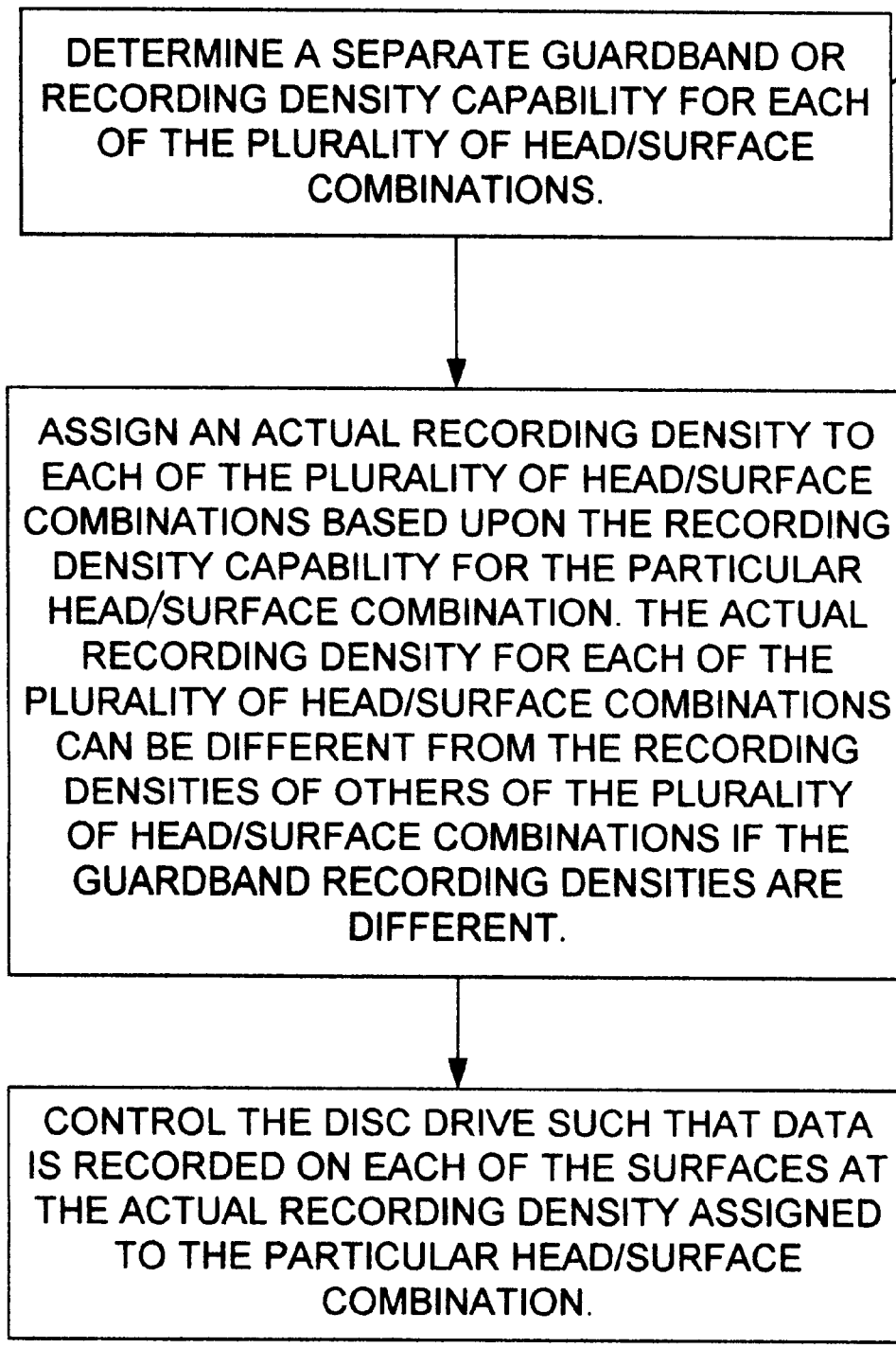
FIG. 3 is a flow diagram illustrating a preferred method of controlling the disc drive of the present invention such that the actual recording density for each of the plurality of head/media combinations can be different from the recording densities of other head/media surface combinations.

FIG.3 is a flow diagram which illustrates one preferred method in which drive 10 of the present invention is controlled such that the actual recording density for each of the head/media combination is uniquely selected, often differing from the recording densities of other head/media combinations. First, as represented at step 110, a separate guardband recording density or recording density capability for each of the head/media combinations is determined. As discussed above, the guardband recording density can be defined as the avalanche recording density minus a desired design margin.

Next, as illustrated in step 120, an actual recording density is assigned to each of the head/media combinations based upon the recording density capability (i.e., guardband recording density) for the particular head/media combination. The actual recording density for each of the bead/media combinations can be different from the recording densities of other head/media combinations if the guardband recording densities are different. Finally, as illustrated in step 130, controller 12 controls disc drive 10 such that data is recorded on each of the disc surfaces at the actual recording density assigned to the particular head/media combination.

Although the present invention has been described with reference to preferred embodiments, workers skilled in the art will recognize that changes may be made in form and detail without departing from the spirit and scope of the invention.

What is claimed is:

1. A method of storing data in a disc drive having a plurality of magnetic data heads each supported adjacent a corresponding one of a plurality of disc surfaces of a disc stack to form a plurality of head/surface combinations, the method comprising:

determining a separate guardband recording density for each of the plurality of head/surface combinations, wherein determining the separate guardband recording density for each of the plurality of head/surface combinations comprises:

determining a separate avalanche recording density for each of the plurality of head/surface combinations, wherein the avalanche recording density for each of the plurality of head/surface combinations is the recording density above which a predetermined maximum error threshold for the disc drive will be exceeded; and subtracting a design margin recording density for the disc drive from each of the separate avalanche recording densities to determine the guardband recording density for each of the plurality of head/surface combinations;

assigning an actual recording density to each of the plurality of head/surface combinations based upon the guardband recording density for the particular head/surface combination such that the actual recording density assigned to each head/surface combination does not exceed the guardband recording density for the particular head/surface combination, and such that a total effective net capacity change of the disc drive is equal to zero, wherein the total effective net capacity change of the disc drive is equal to a summation of the difference, for each head/surface combination, between the actual recording density for each head/surface combination and an effective recording density selected for the disc drive, wherein assigning the actual recording density for each of the plurality of head/surface combinations results in different ones of the plurality of head/surface combinations having different recording densities assigned thereto; and controlling the disc drive such that data is recorded on each of the surfaces at the actual recording density assigned thereto.

* * * * *